United States Patent [19]
Stites

[11] Patent Number: 6,062,581
[45] Date of Patent: *May 16, 2000

[54] LEANING RECUMBENT TRICYCLE

[76] Inventor: William J. Stites, 43-30 48 St., #A7, Sunnyside, N.Y. 11104

[*] Notice: This patent issued on a continued prosecution application filed under 37 CFR 1.53(d), and is subject to the twenty year patent term provisions of 35 U.S.C. 154(a)(2).

[21] Appl. No.: 08/692,941

[22] Filed: Aug. 7, 1996

[51] Int. Cl.[7] ........................................... B62K 1/00
[52] U.S. Cl. .................. 280/263; 280/266; 280/270; 280/226.1; 280/282; 280/274
[58] Field of Search .................. 280/220, 221, 280/226.1, 227, 234, 235, 263, 266, 270, 282, 240, 271, 274

[56] References Cited

U.S. PATENT DOCUMENTS

| | | | |
|---|---|---|---|
| 3,583,727 | 6/1971 | Wallis | 280/283 |
| 4,283,070 | 8/1981 | Forrestall et al. | 280/266 |
| 4,303,255 | 12/1981 | Thomas | 280/234 |
| 4,325,565 | 4/1982 | Winchell | 280/282 |
| 4,423,795 | 1/1984 | Winchell et al. | 180/215 |
| 4,432,561 | 2/1984 | Feikema et al. | 280/263 |
| 4,437,535 | 3/1984 | Winchell et al. | 180/215 |
| 4,469,188 | 9/1984 | Mita | 180/215 |
| 4,541,501 | 9/1985 | Kawasaki | 180/215 |
| 4,634,137 | 1/1987 | Cocksedge | 280/282 |
| 4,659,098 | 4/1987 | Jacobson | 280/263 |
| 4,778,192 | 10/1988 | McElfresh | 280/226.1 |
| 5,240,267 | 8/1993 | Owsen | 280/240 |
| 5,280,937 | 1/1994 | Needham | 280/270 |
| 5,354,084 | 10/1994 | Lofgren et al. | 280/266 |
| 5,568,935 | 10/1996 | Mason | 280/266 |
| 5,607,171 | 3/1997 | Labranche | 280/238 |

*Primary Examiner*—Daniel G. DePumpo

[57] ABSTRACT

A human-powered recumbent tricycle with an articulated frame that permits leaning of the single-wheeled front sub-frame (10) during turns. While the seat (20) and pedal crank (18) move the driver's body with the leaning front sub-frame (10), the two-wheeled rear sub-frame (71) carries the handlebar (90) for optimum driver control of vehicular orientation. Steering of the front wheel (16) is accomplished by two cables (60L, 60R) within housings (61L, 61R) that provide immunity from distortions caused by articulation (100) rotations during leaning. Front wheel (16) drive utilizes a universal joint hub (30) for continuous power drive and no chain (40, 50) twist throughout the full turning radius. High seat (20) height and narrow wheelspan of the two rear wheels (80L, 80R) provide for improved visibility and traffic penetration on congested urban streets. A low cargo rack (75) is provided such that carrying cargo lowers the overall center of gravity and increases vehicular stability. Since the front wheel (16) drive system is self-contained within the front sub-frame (10), the rear sub-frame (70) is interchangeable with other rear sub-frame (70) configurations; whereby this modular system can create vehicles for personal transportation, delivery, pedicabs, flat-bed trucks, and other custom needs; all with the same front drive sub-frame (10).

16 Claims, 14 Drawing Sheets

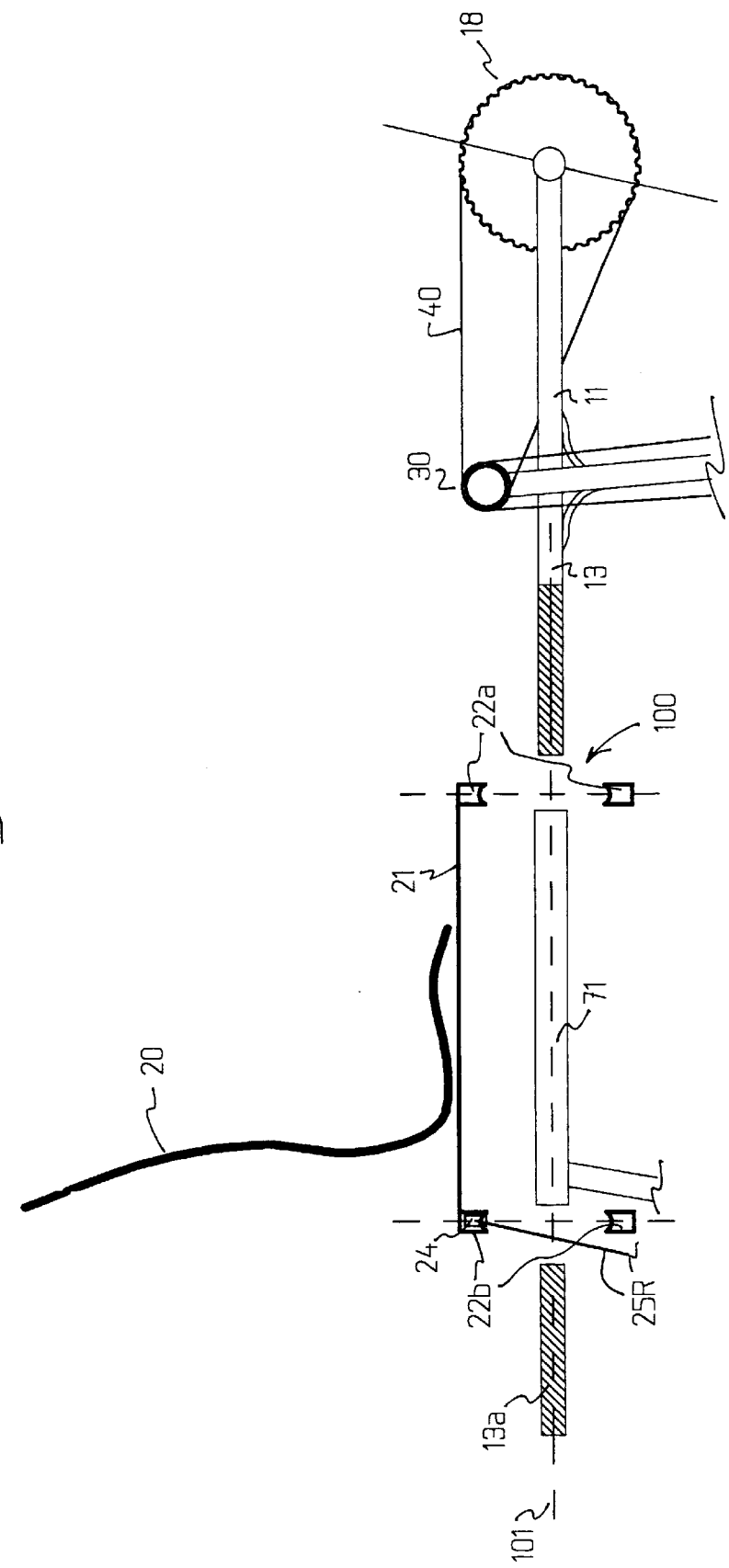

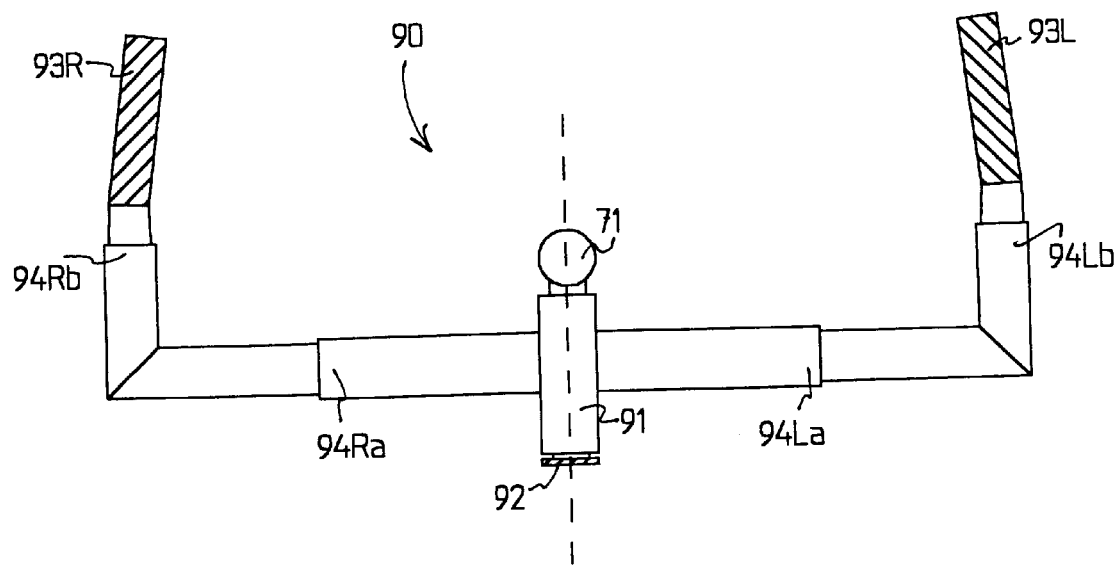

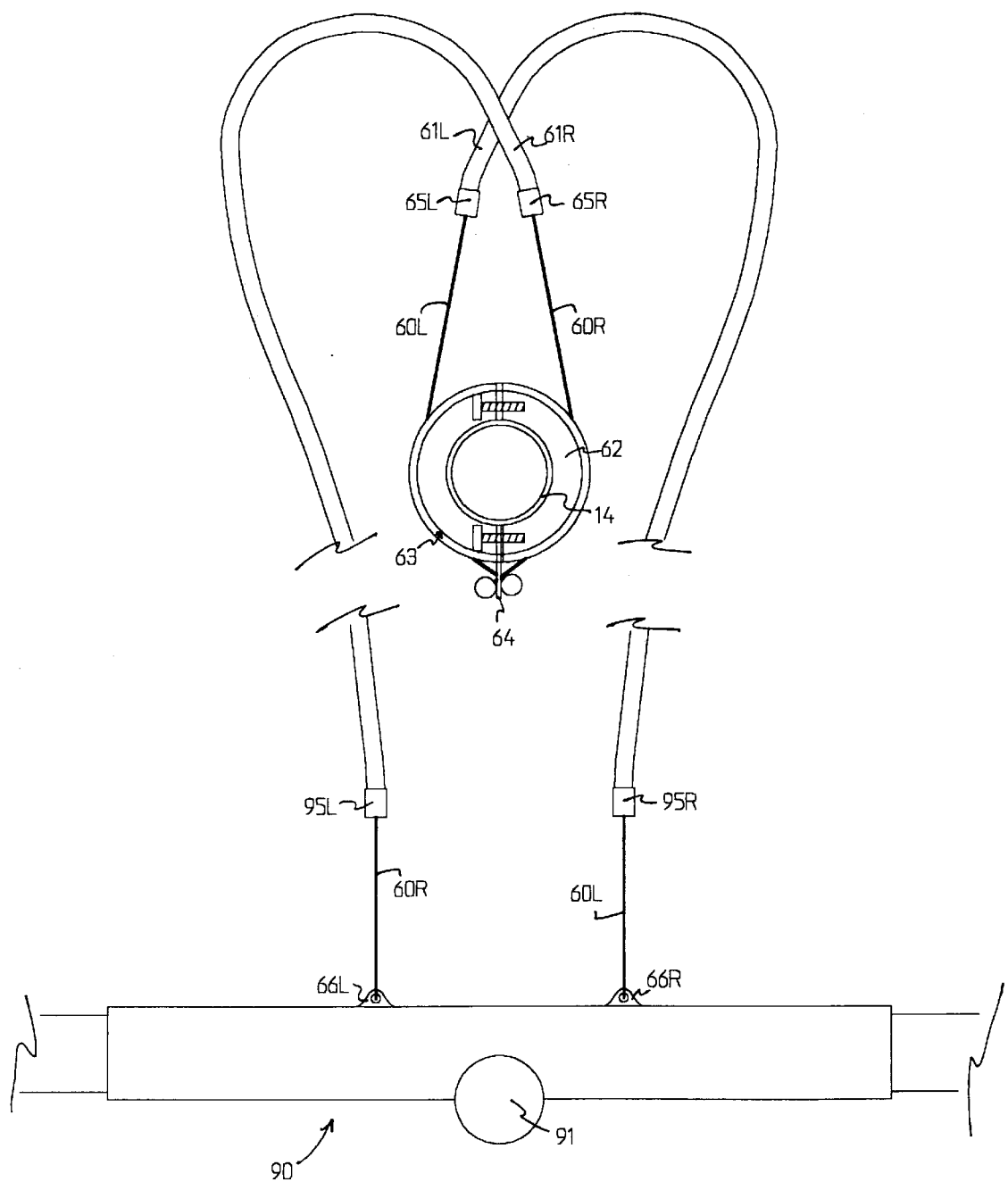

LEANING RECUMBENT TRICYCLE

BACKGROUND

1. Field of Invention

The tricycle of the invention is in the field of human-powered vehicles.

2. Discussion of Prior Art

U.S. Pat. No. 5,240,267 to Owsen shows a human-powered leaning tricycle. This appears to be the closest prior art to the invention, as front wheel drive is also specified. However, the driver position is not recumbent, but shows instead a somewhat standard upright bicycle riding position. A primary disadvantage of this embodiment is that all of the driver's points of contact, that is, the seat, the handlebars and the pedals, are moving with the leaning front section. In this way, the driver cannot exert a force directly between and including the front and rear sections, whereby accuracy of leaning moments is greatly compromised. Indeed, the driver must shift his/her weight with little hope of correcting an overshift or undershift during a critical turn.

U.S. Pat. No. 3,583,727 to Wallis shows several leaning tricycles. The preferred embodiment is not human-powered. However, one embodiment shown by Wallis is human-powered via pedals. This embodiment is not thoroughly displayed to explain power relayance to a driven wheel and how this affects the overall operation of the vehicle. Additionally, this embodiment also exemplifies the disadvantage noted above where all the driver's points of contact are moving with the leaning front section, resulting in less control of leaning than can be accomplished by the tricycle of the invention. The longitudinal axis of rotation for leaning is well defined as sloping upwardly toward the front of the vehicle thereby imparting a rear steering affect.

U.S. Pat. Nos. 4,469,188 to Mita and 4,541,501 to Kawasaki are nearly identical and show a leaning scooter-like tricycle that is not human-powered. These are cited as showing a similar leaning concept as the tricycle of the invention, whereby a longitudinal axis of rotation is incorporated.

U.S. Pat. No. 4,423,795 to Winchell et al. shows a cambering, also known as leaning, tricycle. The preferred embodiment shown by Winchell et al. is not a human-powered vehicle, but is cited nonetheless as displaying a similar leaning concept to the invention. U.S. Pat. No. 4,325,565 to Winchell shows a leaning, motorized tricycle. U.S. Pat. No. 4,437,535 to Winchell et al. shows a three-wheeled leaning motorcycle. All of these prior art references provide for some control of the amount of lean via foot control of the rear sections. This provides the driver with a direct feel of the rear section. This information of the relative positions and relationship of the front and rear sections provides a desirable control of leaning by the driver as he/she can exert a force between and including the front and rear sections.

All of the above noted prior art shows that the handlebars are attached to the leaning front section. Thus, in no prior art cited is the driver afforded direct control of the amount of lean by way of the hands.

All previous attempts at leaning tricycles noted above have used a low longitudinal axis of rotation—approximating the level of the wheel axles. A disadvantage of this arrangement is the large amount of lateral displacement of the seat upon leaning. Since the driver upon the seat represents a majority of the vehicular mass, this lateral displacement results in a considerable shift of the center of gravity of the vehicle from the midline.

The tricycle of the invention helps to solve many relatively new transportation problems, especially in the urban environment. This may be why prior inventors have not conceptualized the tricycle of the invention to date. The primary factors of traffic congestion and pollution, at their presently high and ever-growing levels, has given rise to the combination of characteristics of human power with a recumbent driver position, high seat placement, and narrow wheelspan. The tricycle of the invention is a zero-emission vehicle that is designed to penetrate traffic as well as a bicycle.

Problems such as traffic congestion, pollution, pedestrian intimidation, social isolation, etc., have developed gradually in the cities of the world and are largely a result of the over-utilization of cars and trucks. The tricycle of the invention contributes greatly to the solution of these relatively new problems.

3—OBJECTS AND ADVANTAGES

Accordingly, several objects and advantages of my invention are as follows:

Provides personal transportation—while the invention may be used anywhere and upon multiple terrains, it is specifically designed for the urban environment. Satisfying new federal legislative mandates for addressing the inefficiencies of single occupancy vehicle trips may be the most important object and advantage of this invention.

Cargo carrying capacity—like other tricycles, the invention provides for load carrying capacity well beyond bicycles. Thus the invention can be used for local errands, such as grocery shopping or the post office.

Efficiency—a significant characteristic of human-powered vehicles (HPV's) is that they are highly efficient.

Pollution-free—the tricycle of the invention is a zero-emission vehicle.

No fuel requirements.

Very little maintenance—the simplicity of HPV's provides for very low maintenance.

Quiet operation.

Exercise opportunity—there is a great benefit to the incidental exercise occurring while traveling.

Recumbent driver position—the recumbent position is roughly defined herein as where the pedal crank is located at a similar height to, and in front of, the seat. This keeps the driver's legs relatively horizontal during pedalling. Since the thighs of the driver do not move down below the level of the seat, the seat can be of full width. Additionally, the recumbent driver position provides the opportunity for an ergonomic seat back. Thus, the seat can support the buttocks and back (spine) of the driver for increased comfort and efficiency.

High seat placement—with anticipated uses upon city streets, the preferred embodiment manifests a high seat placement for good visibility, as compared to the low seat placement and poor visibility of typical recumbent vehicles. Indeed, dual visibility is enhanced in that the driver can see street content and activities, as well as be seen by motorists and other road users.

Narrow wheelspan—the narrow wheelspan approximates the width of a bicycle handlebar and thus allows the tricycle of the invention to penetrate traffic as well as a bicycle. In this way, this tricycle can access minimum traffic openings on highly congested city streets.

4—INVENTION FEATURES (Separate Sections 5 and 6 for Figure descriptions and Reference Numeral identifications used hereafter.)

Front wheel drive—a universal joint hub is incorporated to allow the transfer of locomotive power without affecting steering, and without chain twist—two classic problems with front wheel drive.

Articulated frame—a rotating joint (100) between a front sub-frame (10) and a rear sub-frame (70) provides for leaning of the front sub-frame (10). This leaning provides stability during turns in a manner similar to a bicycle's dynamics. Indeed, the center of gravity remains vertically over the front wheel (16) for a well balanced turn.

Modular front section—the nature of the articulation (100) described allows it to be disarticulated withease. Since most mechanical parts of the vehicle are included in the front sub-frame (10), the rear sub-frame (70) is relatively simple. In this way, the rear sub-frame (70) is easily interchangeable with other rear sub-frame (70) configurations. Therefore, the tricycle of the invention can serve as many different types of vehicles depending on the nature of the rear sub-frame (70) chosen.

High longitudinal axis of rotation—a significant advantage of a high longitudinal axis of rotation (101) is that lateral displacement occurs at the front wheel (16), since it is now further away from the axis of rotation for leaning (101) than the seat. Since the seat is minimally displaced, the center of gravity of the driver remains close to the vehicle midline. Additionally, as the driver leans into a turn, the front wheel (16) moves to the opposite side from the direction of turning and thereby changes the footprint of the vehicle such that there are two functional 'outer' wheels during turns. (See FIG. 8) These two 'outer' wheels, together with the maintenance of the center of gravity directly over the front wheel, provide for very high stability during turns.

Handlebar (90) affixed to rear sub-frame (70)—this provides a reference to the driver regarding the orientation of the rear sub-frame (70). Additionally, since the rear wheels (80L, 80R) remain on the ground during all driving operations, the driver can extrapolate the ground orientation through the handlebars (90).

The inventor submits that controlling the degree of lean is more accurately executed by the hands than by the feet, as shown in prior art. Additionally, the feet and legs of the driver on the invention are preoccupied with powering the pedal crank (18) for locomotion. The tricycle of the invention also takes advantage of the fact that the hands are well controlled by a significantly large amount of the brain—this is why the hands can achieve such fine motor control as well as high sensitivity. Due to this anatomical fact, the hands provide more accurate control of leaning than the feet and, therefore, safer riding. There is also an efficient simp lcty of the inventor's system where both steering and leaning are controlled by hand movements upon the same handlebar (90).

Dual-cable steering—note that the front sub-frame (10) supports the steer tube (14) and the rear sub-frame (70) supports the handlebars (90). Relative displacements of the front and rear sub-frames (10, 70) could cause steering distortions if the linkage between the steer tube and the handlebar were rigid. Flexible cables provide the solution for these distortions as they are encased within two housings (61) exhibiting a small degree of slack. In this way, the position of the steer cables (60) within the two housings (61) is unaffected by changes in the relative position of the front sub-frame (10) and the rear sub-frame (70). The steering is then immune to distortions which could result from frame articulation (100) rotations during leaning.

5—DESCRIPTION OF DRAWINGS

FIG. 7 is an exploded view illustrating the telescope-type articulation, including the seating apparatus.

FIG. 8 shows the jointed handlebar.

FIG. 11 shows a top view of the steering system.

6—LIST OF REFERENCE NUMERALS

10—Front sub-frame
11—Boom
12—Head tube
13—Front top tube
13a—Front top tube continuation
14—Steer tube
15—Front fork
16—Front wheel
16x—Tire contact patch for front wheel
17—Front wheel hub with internal gears
18—Pedal crank including sprocket, crank arms, and pedals
20—Seat
21—Seat bar
22a—Front seat bar collar clamp
22b—Rear seat bar collar clamp
24—Mounting bar for lean-restraint cables
25L—Left lean restraint cable, including turnbuckle and spring
25R—Right lean restraint cable, including turnbuckle and spring
30—U-joint hub
31—U-joint
32L—Left u-joint sprocket
32R—Right u-joint sprocket
34L—Left u-joint bearing
34R—Right u-joint bearing
35L—Left u-joint bearing mount
35R—Right u-joint bearing mount 36a—Collar clamp for front of left u-joint bearing mount
36b—Collar clamp for rear of left u-joint bearing mount
37L—Setscrew for left u-joint bearing
37R—Setscrew for right u-joint bearing
40—Top chain linking the pedal crank to the left u-joint sprocket
50—Down chain linking the right u-joint sprocket to the front wheel hub
60L—Left steer cable
60R—Right steer cable
61L—Left cable housing
61R—Right cable housing
62—Steer tube collar clamp
63—Groove for steer cables
64—Cable hold
65L—Left front cable stop
65R—Right front cable stop
70—Rear sub-frame
71—Rear top tube
72—Down tube
73—Transverse axle tube
74—Cargo rack tubes
75—Cargo rack
76L—Left brace tubes
76R—Right brace tube
77L—Left support cable, including turnbuckle
77R—Right support cable, including turnbuckle
78L—Left mount for bottom of left lean restraint cable
78R—Right mount for bottom of right lean restraint cable
80L—Left rear wheel
80Lx—Tire contact patch for left rear wheel
80R—Right rear wheel
80Rx—Tire contact patch for right rear wheel
90—Handlebar, jointed
91—Handlebar pivot joint
92—Handlebar pivot joint brace
93L—Left hand grip
93R—Right hand grip
94La—Left handlebar joint, near handlebar pivot joint
94Lb—Left handlebar joint, near left hand grip
94Ra—Right handlebar joint, near handlebar pivot joint
94Rb—Right handlebar joint, near right hand grip
95L—Left rear cable stop for steering
95R—Right rear cable stop for steering
96L—Left handlebar tab for steer cable clamping bolt
96R—Right handlebar tab for steer cable clamping bolt
100—Rotating joint, comprising front top tube [13] telescoping into rear top tube [71], secured by front and rear seat bar collar clamps [22a, 22b]
101—Longitudinal axis of rotation for leaning
102—Vertical axis of rotation for steering
103—Axis of deflection for u-joint function

7—DESCRIPTION OF INVENTION

Figure 1:
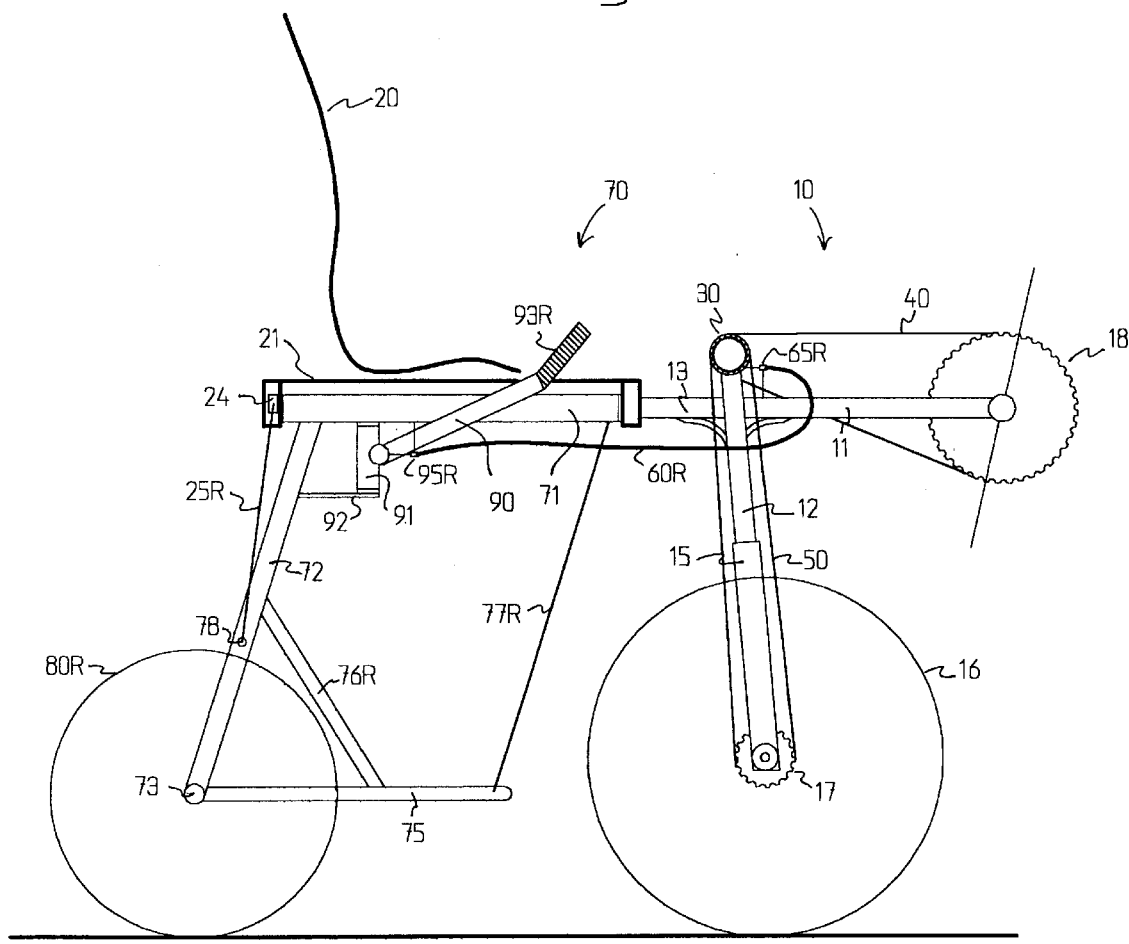
FIG. 1 shows a side view of the tricycle of the invention.

FIG. 1 shows a side view of the tricycle of the invention. Parts of the front sub-frame (10) that are illustrated include a pedal crank (18) that is supported by a boom (11), that is affixed to the front of the head tube (12). The top chain (40) links the pedal crank (18) to the u-joint hub (30). The front top tube (13) is affixed to the rear of the head tube (12). The steer tube (14), which is not visible in this view, passes through the head tube (12) and is affixed to the top of the front fork (15). The front wheel (16) is held at its axle by the front fork. The down chain (50) links the u-joint hub (30) to the front wheel hub (17). The seat (20) is mounted over the seat bar (21), which is affixed to the front top tube (13). The right lean restraint cable (25R) is supported at its top by the mounting bar for lean restraint cables (24), and at its bottom by the mount for bottom of lean restraint cables (78). Since the two rear wheels (80L, 80R) are side by side, only the right rear wheel (80R) is visible. Other parts of the rear sub-frame (70) that are illustrated include a rear top tube (71) which provides attachment for the down tube (72), the top of the handlebar pivot joint (91), left and right rear cable stops (95L, 95R), and left and right support cables (77L, 77R). Note that the steering cable housings (61) connect the rear cable stops (95) to the front cable stops (65). The down tube (72) provides attachment for the handlebar pivot joint brace (92), the mount for bottom of lean restraint cables (78), left and right brace tubes (76L, 76R), and transverse axle tube (73). The left and right support cables (77L, 77R) connect the front end of the rear top tube (71) to the front corners of the cargo rack (75).

Figure 2:
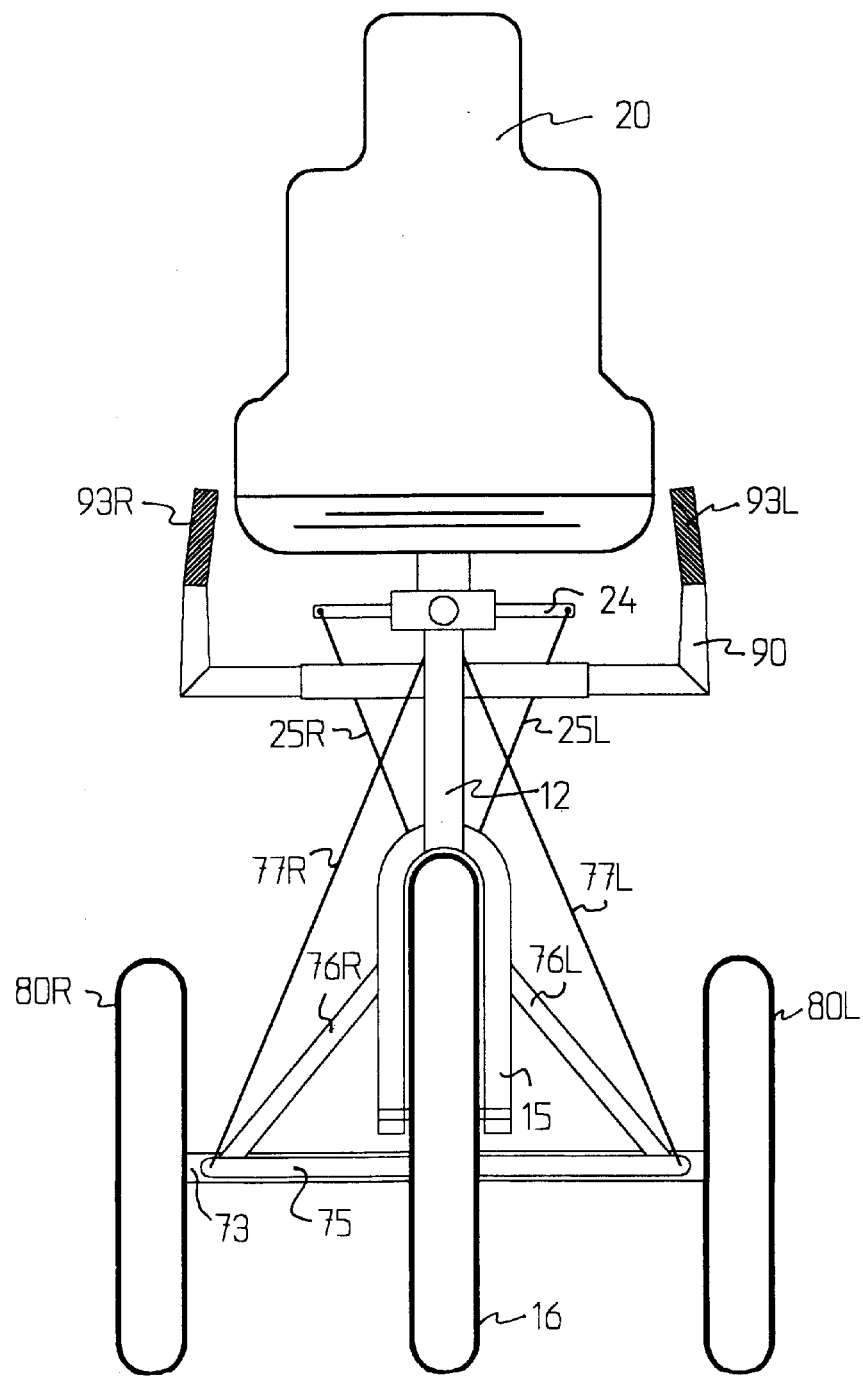
FIG. 2 is a front view of the invention.

FIG. 2 is a front view of the tricycle of the invention. Parts that are visible are the seat (20), the mounting bar for the lean restraint cables (24), left and right lean restraint cables (25L, 25R), jointed handlebar (90), head tube (12), left and right support cables (77L, 77R), front fork (15), front wheel (16), left and right brace tubes (76L, 76R), cargo rack (75), transverse axle tube (73), and two rear wheels (80L, 80R).

Figure 3:
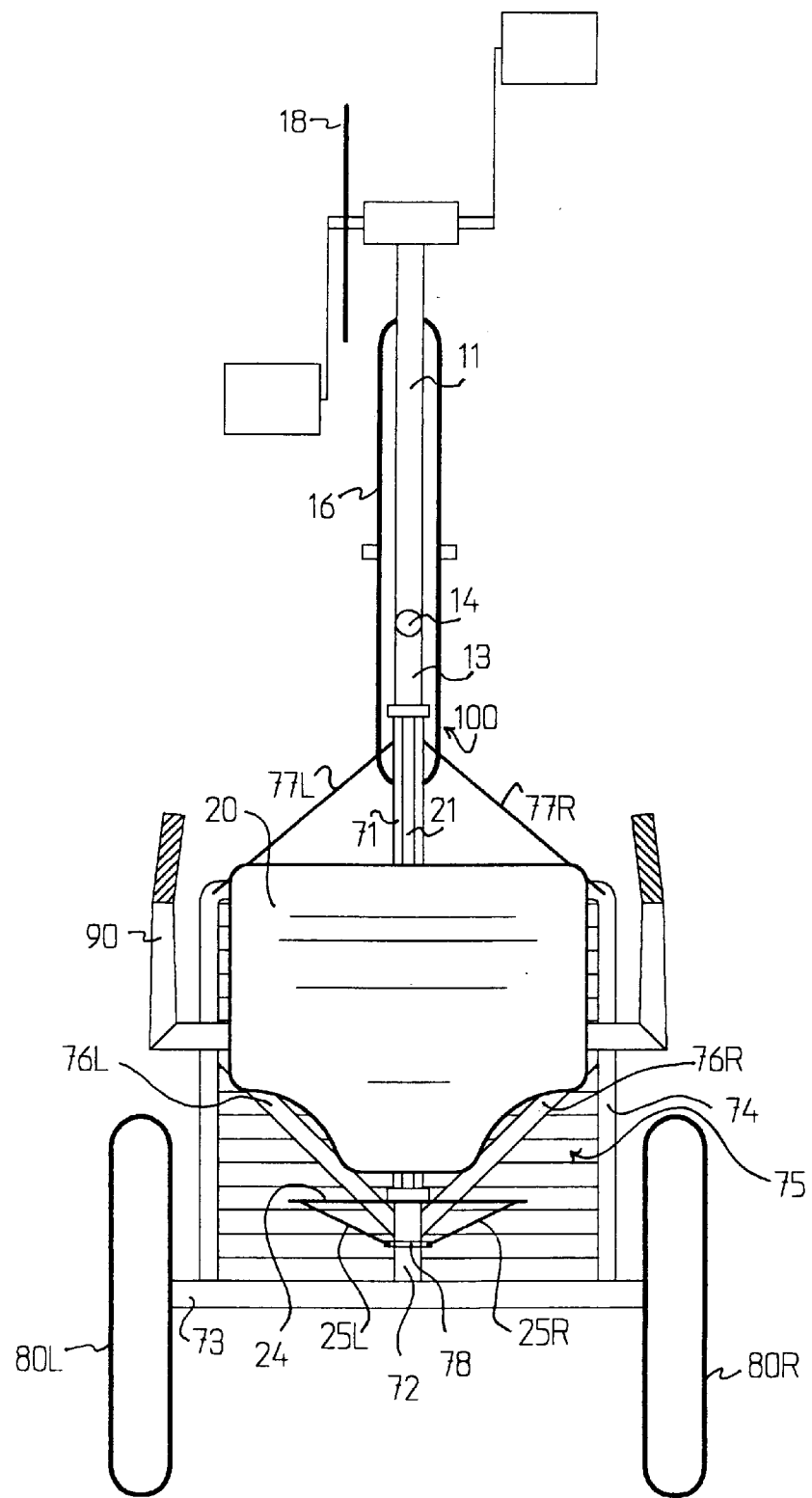
FIG. 3 is a top view of the invention.

FIG. 3 shows a top view of the invention. Visible parts are: the pedal crank (18), which is attached to the boom (11), the front wheel (16), front top tube (13) which inserts into the rear top tube (71) to create the rotating joint (100); left and right support cables (77L, 77R), seat (20) which is mounted on the seat bar (21) which is in turn affixed to the front top tube (13). Also shown is the jointed handlebar (90), cargo rack tubes (74) which support the cargo rack (75); mounting bar for lean restraint cables (24) which is attached to the seat bar (21); left and right lean restraint cables (25L, 25R) connecting the mounting bar for lean restraint cables (24) to the mount for the bottom of the lean restraint cables (78). Other visible parts are the down tube (72), left and right brace tubes (76L, 76R), transverse axle tube (73), and two rear wheels (80L, 80R).

Figure 4:
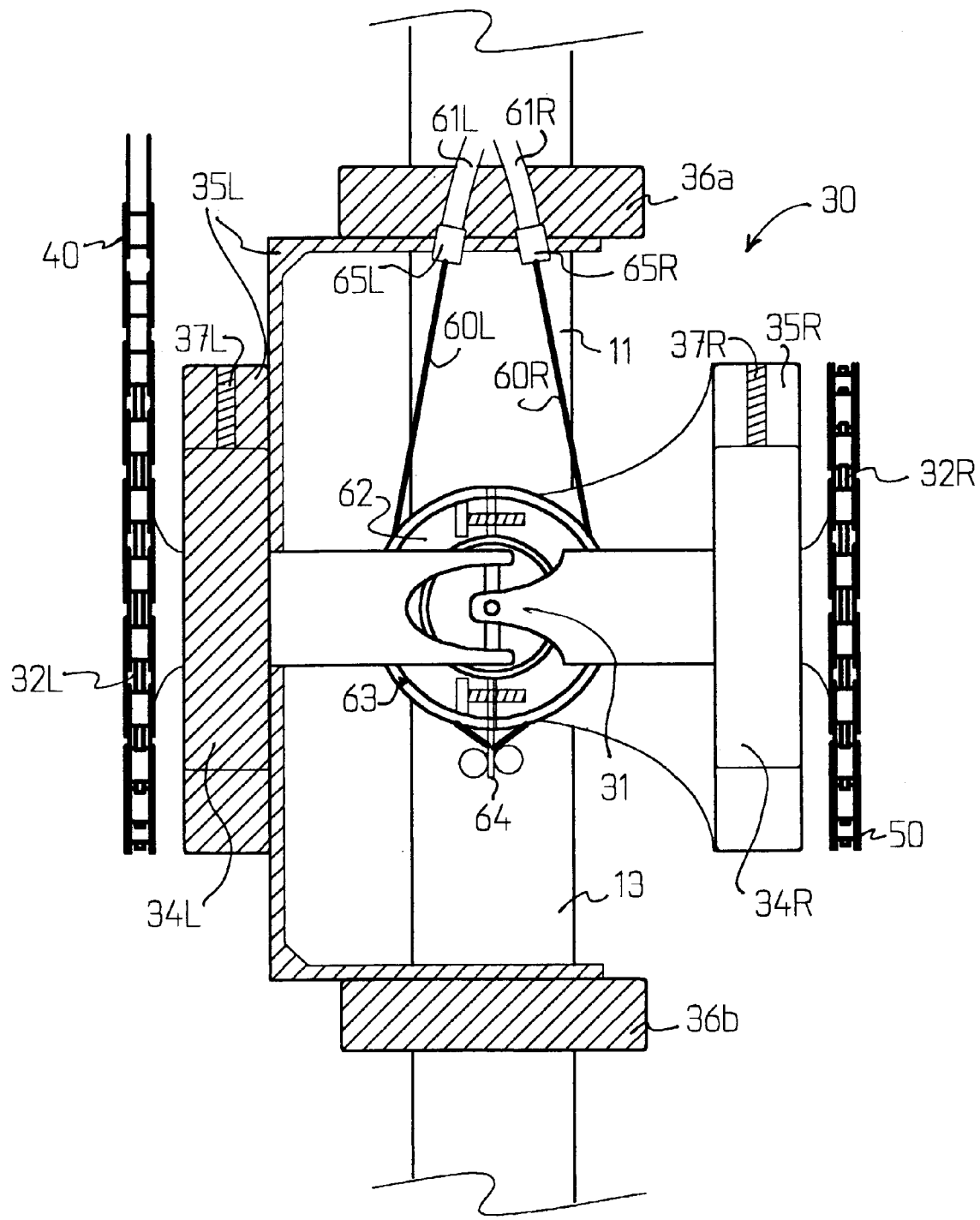
FIG. 4 is a detailed top view of the u-joint drive hub and steer apparatus, including steer tube collar clamp, steer cables, and cable housings .

FIG. 4 is a detailed top view of the u-joint hub (30) which is comprised of a u-joint (31) and the left and right u-joint sprockets (32L, 32R). The center of the u-joint (31) is located directly above the steer tube (14). Portions of the front sub-frame (10) shown are the boom (11) and the front top tube (13). The u-joint (31) is affixed at its left end to the left u-joint sprocket (32L) which carries the top chain (40). The left half of the u-joint (31) is supported by the left u-joint bearing (34L) which is mounted within the left u-joint bearing mount (35L) and held in place via a setscrew (37L). The front cable stops (65L, 65R), are mounted on the front of the left u-joint bearing mount (35L), just above the front collar clamp (36a). The cable stops (65L, 65R) support the ends of the cable housings (61L, 61R) while the steer cables (60L, 60R) pass through and extend to the steer tube collar clamp (62). The steer cables (60L, 60R) lay into the groove for steer cables (63) and end at the cable hold (64), both of which are found on the steer tube collar clamp (62). The collar clamp (62) is an integral part of the right u-joint bearing mount (35R) which supports the right u-joint bearing (34R) which in turn supports the right half of the u-joint (31). The right u-joint bearing (34R) is also held in place by a setscrew (37R). The right end of the u-joint (31) is affixed to the right u-joint sprocket (32R) which supports the down chain (50).

Figure 4L:
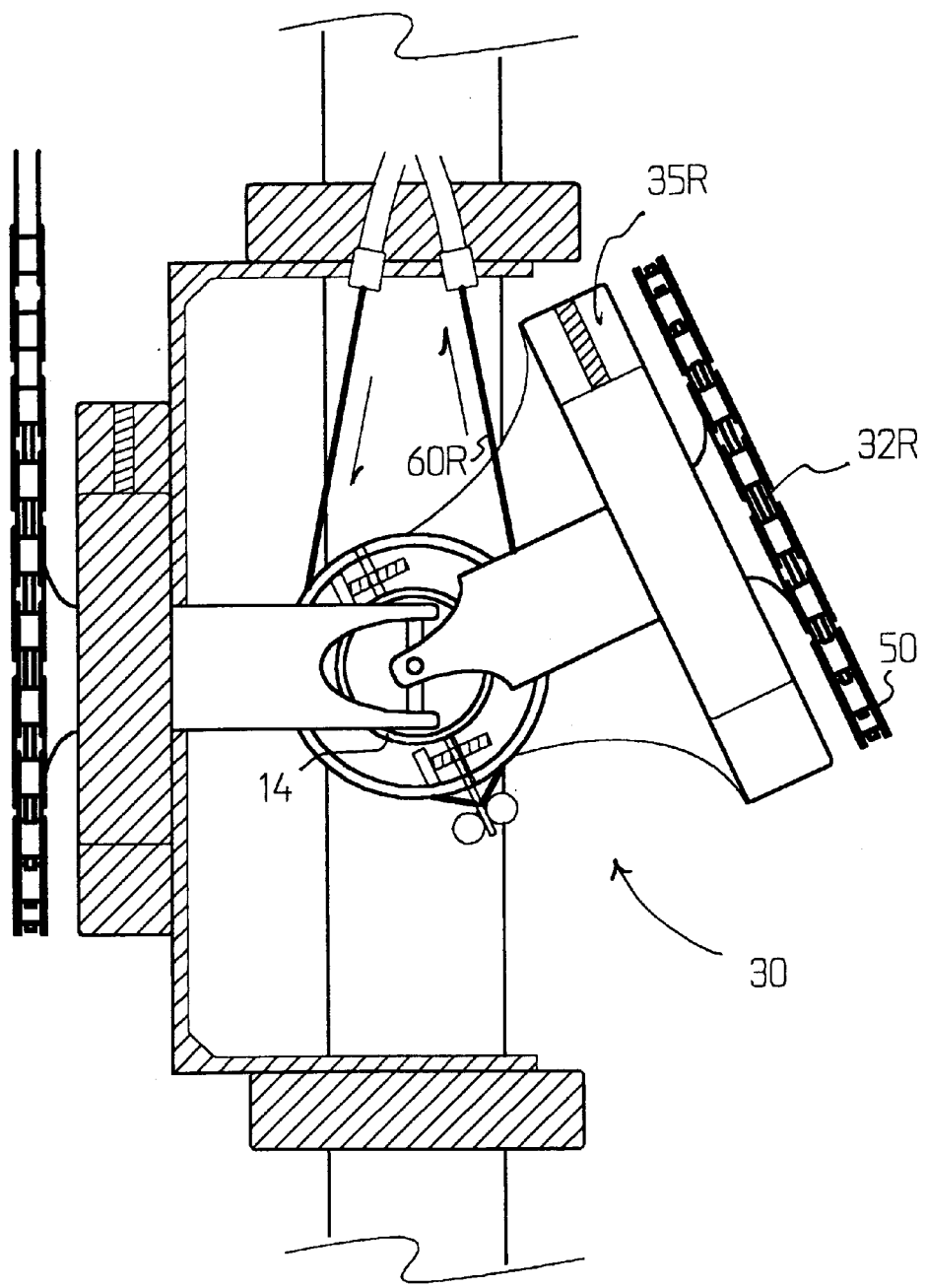
FIG. 4L shows a detailed top view of changes in the u-joint drive hub and steer cables during a left turn.
Figure 4R:
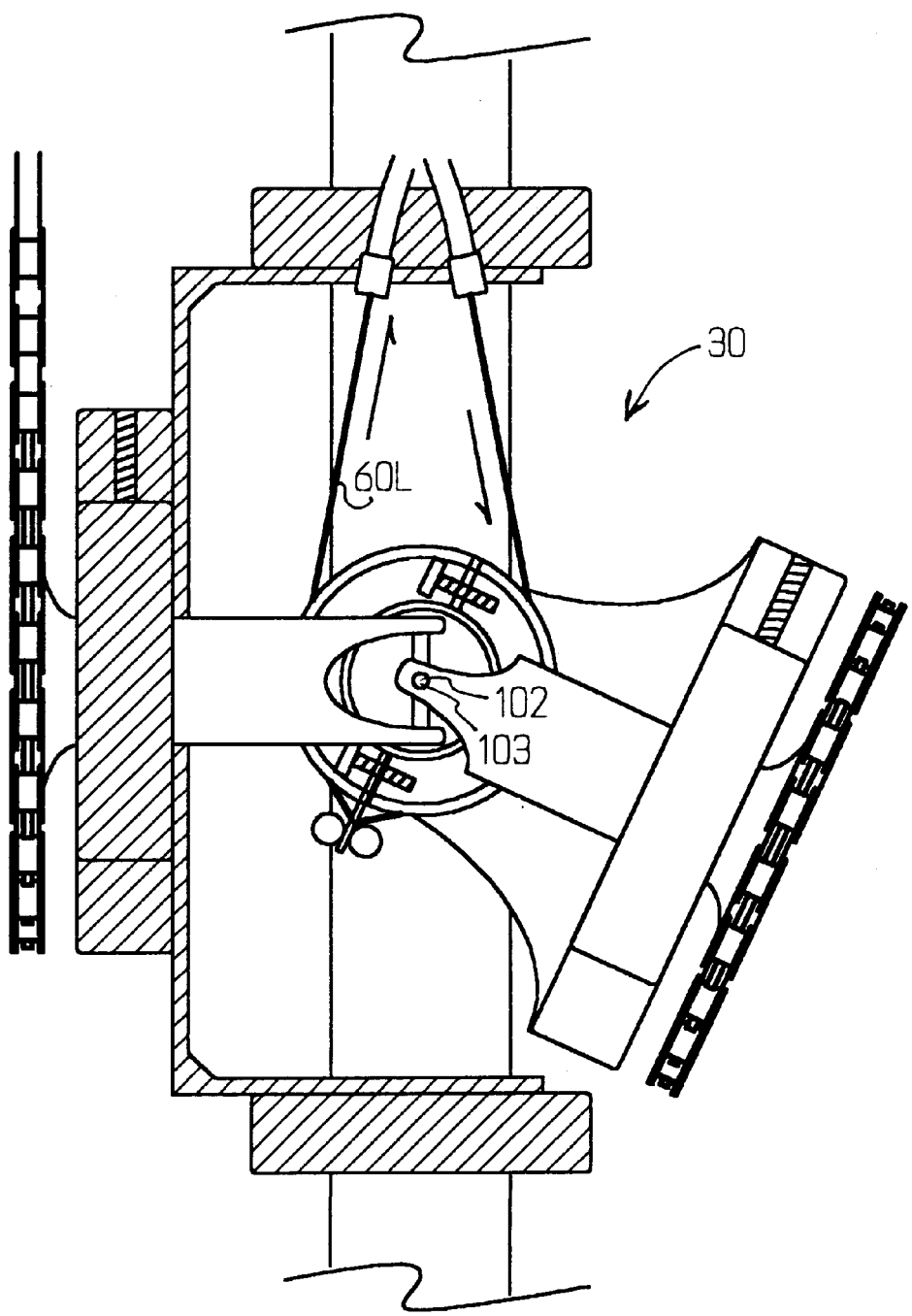
FIG. 4R shows a detailed top view of changes in the u-joint drive hub and steer cables during a right turn.

FIGS. 4L and 4R show movements of the u-joint hub (30) and steering apparatus during left and right turns, respectively. In FIG. 4L, the right steer cable (60) pulls the steer tube (14) inducing a rotation. Note that since the right u-joint bearing mount (35R) is affixed to the steer tube (14), the entire right half of the u-joint hub (30)—including the right u-joint sprocket (32R) and down chain (50)—move with the steertube (14) rotation. In this way, the down chain (50) remains planar with the front wheel hub (17) for efficient power drive throughout the full turning radius. FIG. 4R shows the effect of left steer cable (60L) pull during a right turn. Note that the axis of deflection of the u-joint (103) is precisely aligned over the axis of rotation for steering (102). In this way, there is a smooth transfer of rotational power throughout the full turning radius, as per the function of the u-joint (31).

Figure 5:
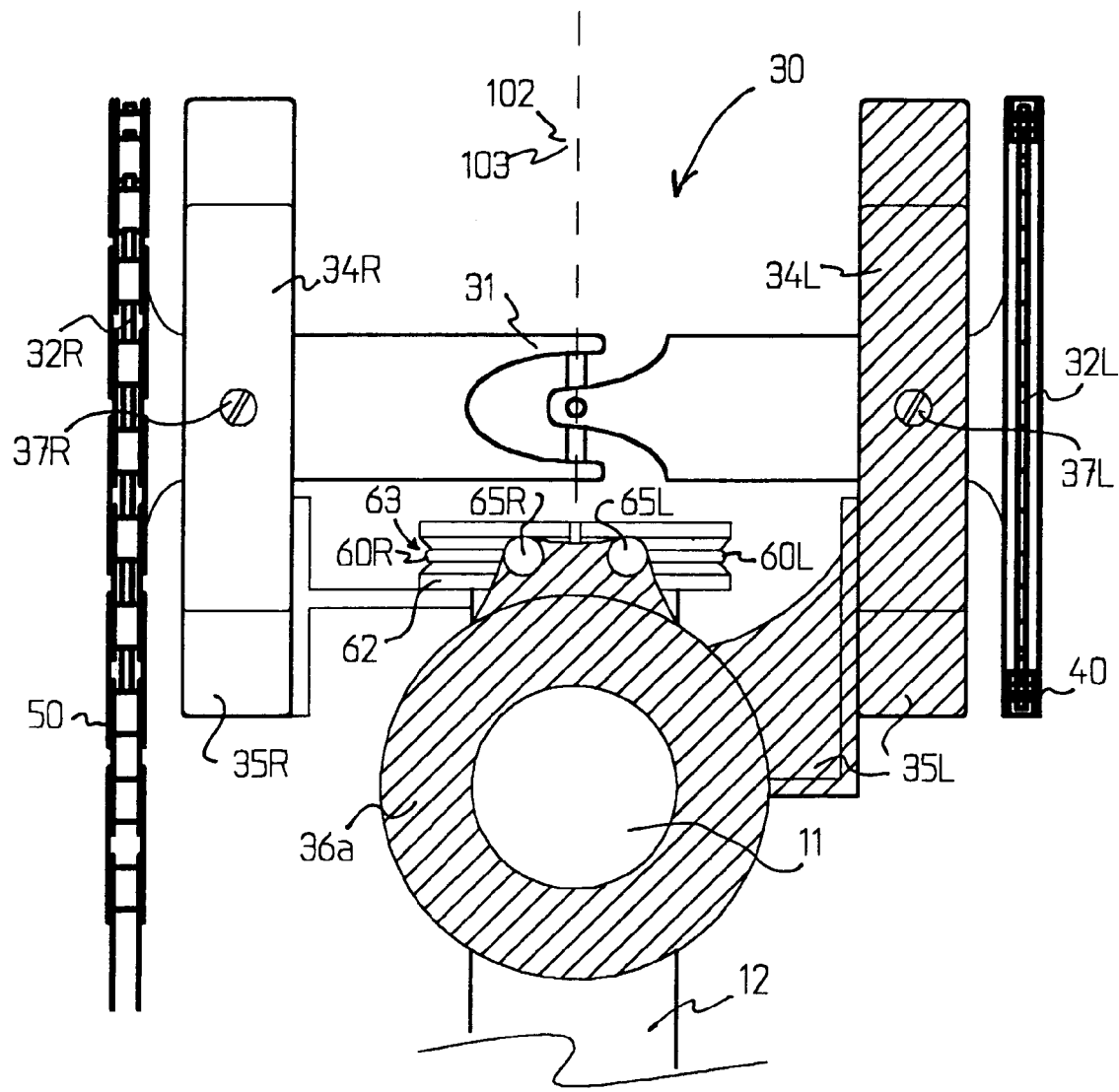
FIG. 5 is a detailed front view of the u-joint drive hub and steer apparatus, including steer tube collar clamp, steer cables, and cable housings.

FIG. 5 is a detailed front view of the u-joint hub (30) and the front portion of the steering apparatus. Showing parts that were introduced in FIG. 4, there is the universal joint (31) connecting two sprockets (32L, 32R). The left u-joint sprocket (32L) is connected to the pedal crank (18) (not shown) via the top chain (40). The right u-joint sprocket (32R) is connected to the front wheel drive hub (17) (not shown) via the down chain (50). Note that there is sufficient clearance between the u-joint (31) and the steer tube collar clamp (62) to allow free rotation of the u-joint (31). This clearance is maintained throughout the full turning radius. As the steer cables (60L, 60R) exit their housings (61L, 61R) at the point of the cable stops (65L, 65R) (affixed upon the left u-joint bearing mount (35L)), they then enter a groove (63) in the collar clamp (62) and wrap around it. Alternate pulling action of the steer cables (60L, 60R) rotates the steertube (14). In this view it is clear that the axis of deflection of the u-joint (103) is precisely matched to coincide with the axis of rotation for steering (102) for efficient function of the u-joint (31).

Figure 6:
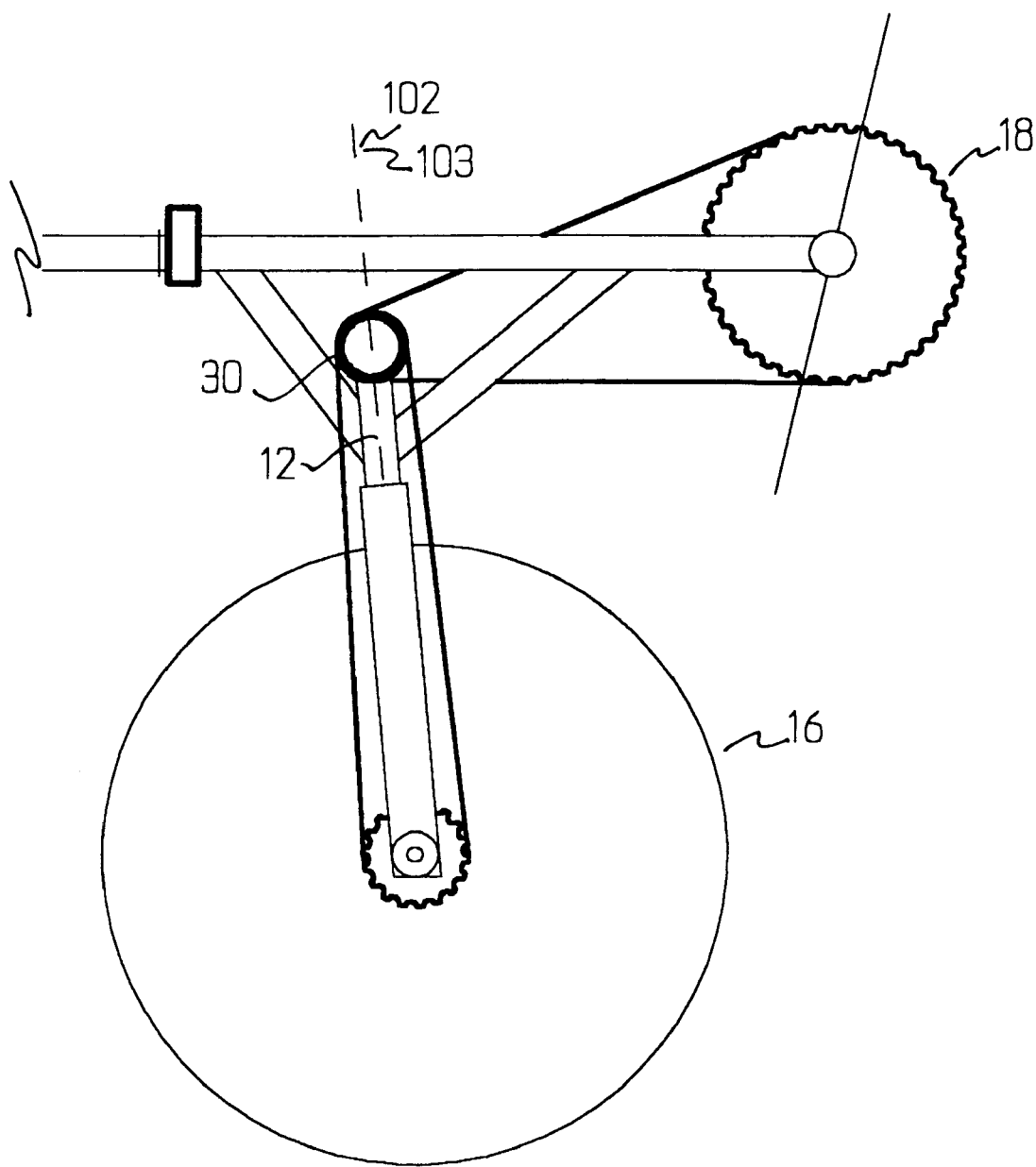
FIG. 6 shows an alternate frame configuration around the u-joint hub.

Differing frame configurations may be used, but with the limitation that the u-joint (31) pass over the steer tube (14) in order to align the axis of deflection of the u-joint (103) with the axis of rotation for steering (102). For example, FIG. 6 shows an alternate frame configuration around the u-joint hub (30). While the preferred embodiment and FIG. 6 show tubular framed structures, many other configurations are possible. For example, a shell-like fiberglass body could hold all the vehicular components in a similar spatial arrangement as a tubular frame, achieving identical mechanical results.

FIG. 7 is an exploded view illustrating the telescope-type rotating articulation (100), including the seating apparatus. The seat (20) is of an ergonomic shape to support the driver's spine, especially throughout the dynamic range of motion. The material of the seat (20) in the preferred embodiment is fabric to provide for accommodation of varying driver body shapes, as well as ventilation in warmer weather. For example, an open mesh seat fabric provides excellent ventilation. This is especially beneficial since the driver is exercising while driving the vehicle, and thus generating considerable heat from within his/her body. The seat (20) is mounted on the seat bar (21) and is adjustable in its location to and fro by the full length of the seat bar (21). The weight of the driver is distributed somewhat evenly over the two seat bar collar clamps (22a, 22b) providing for a desirable force distribution over the frame of the vehicle.

As shown in FIG. 7, the axis of rotation for leaning (101) is longitudinal and runs along the shared center lines of the front top tube (13) and the rear top tube (71). This axis (101) is rather high relative to the ground, being located just under the seat (20). The joint (100) is a telescoping type where the front top tube (13) extends within the rear top tube (71) with sufficient overlap for strength against deflection. There is a close fit whereby the outside diameter of the front top tube (13) is very slightly less than the inside diameter of the rear top tube (71). This rotating joint (100) may include bearings and/or lubrication for ease of motion. The joint is prevented from separating along its longitudinal axis by the two seat bar collar clamps (22a, 22b). The front top tube (13) may extend all the way through the rear top tube (71) and come out of the rear end to receive the rear seat bar collar clamp (22b); or the front top tube (13) can end within the rear top tube (71)—extending at least several inches into the rear top tube (71) for structural integrity. A short front top tube continuation (13a) may be used at the rear end of the rear top tube (71) for supporting the rearseat bar collar clamp (22b). This short tube (13a) should also extend into the rear top tube (71) by several inches for structural integrity. This latter situation whereby the front top tube (13) is discontinuous provides for adjustability in changing the length of the overall frame. This allows further adjustability for different size drivers, in addition to seat adjustment.

Notice that the mounting bar for the lean restraint cables (24) is affixed to the rear end of the seat bar (21). An upper portion of the right lean restraint cable (25R) is also illustrated here.

FIG. 8 shows the jointed handlebar (90). The handlebar (90) is mounted upon a handlebar pivot joint (91). This joint (91) rotates about a vertical axis of rotation, and is fixably mounted to the rear top tube (71). It is additionally braced at its bottom by the handlebar pivot joint brace (92) such that bothends of the handlebar pivot joint (91) are affixed within the rear sub-frame (70) (illustrated best in FIG. 1). This provides for secure maintenance of the handlebar (90) in its horizontal orientation. While the handlebar (90) rotates about the vertical axis to engage steering effects, it is rigid along its transverse plane to provide for leaning control relative to front sub-frame (10) movements. The handlebar (90) also provides for adjustability of the placement and orientation of the hand grips (93L, 93R) by way of joints (94La, 94Lb, 94Ra, 94Rb) that allow different configurations based on seat placement and driver preferences. These joints (94La, 94Lb, 94Ra, 94Rb) allow telescope-type length adjustments and/or rotation adjustments.

Figure 9R:
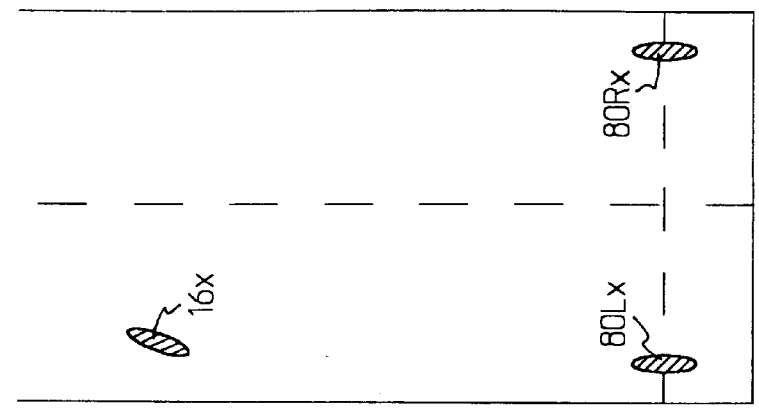
FIG. 9R shows the tire contact patch pattern during a right turn whereby the front tire patch is deviated to the left.
Figure 9L:
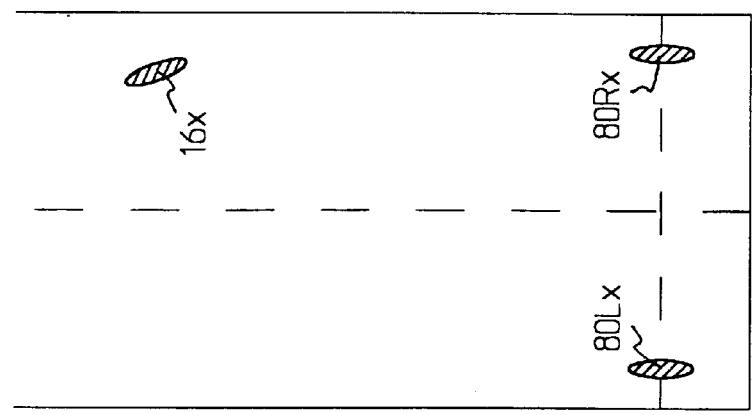
FIG. 9L shows the tire contact patch pattern during a left turn whereby the front tire patch is deviated to the right.
Figure 9:
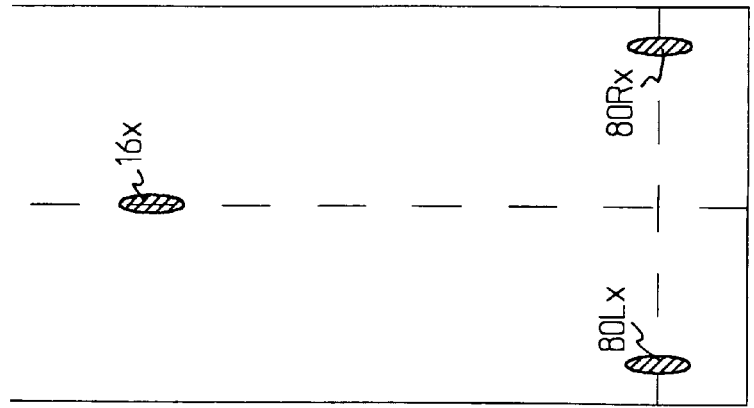
FIG. 9 shows the tire contact patch pattern upon the ground for the neutral position.

FIG. 9 shows the tire contact patch pattern upon the ground for the neutral position. The tire contact patch of the single front wheel (16x) bisects the tracking of the tire contact patches of the two rear wheels (80Lx, 80Rx). During a left turn (see FIG. 9L), the front wheel contact patch (16x) shifts to the right due to rotation of the joint (100) during leaning. The front wheel contact patch (16x) then tracks to the outside of the turn providing enhanced stability. During a right turn, the same phenomena occur but in the reverse directions (see FIG. 9R).

Figure 10:
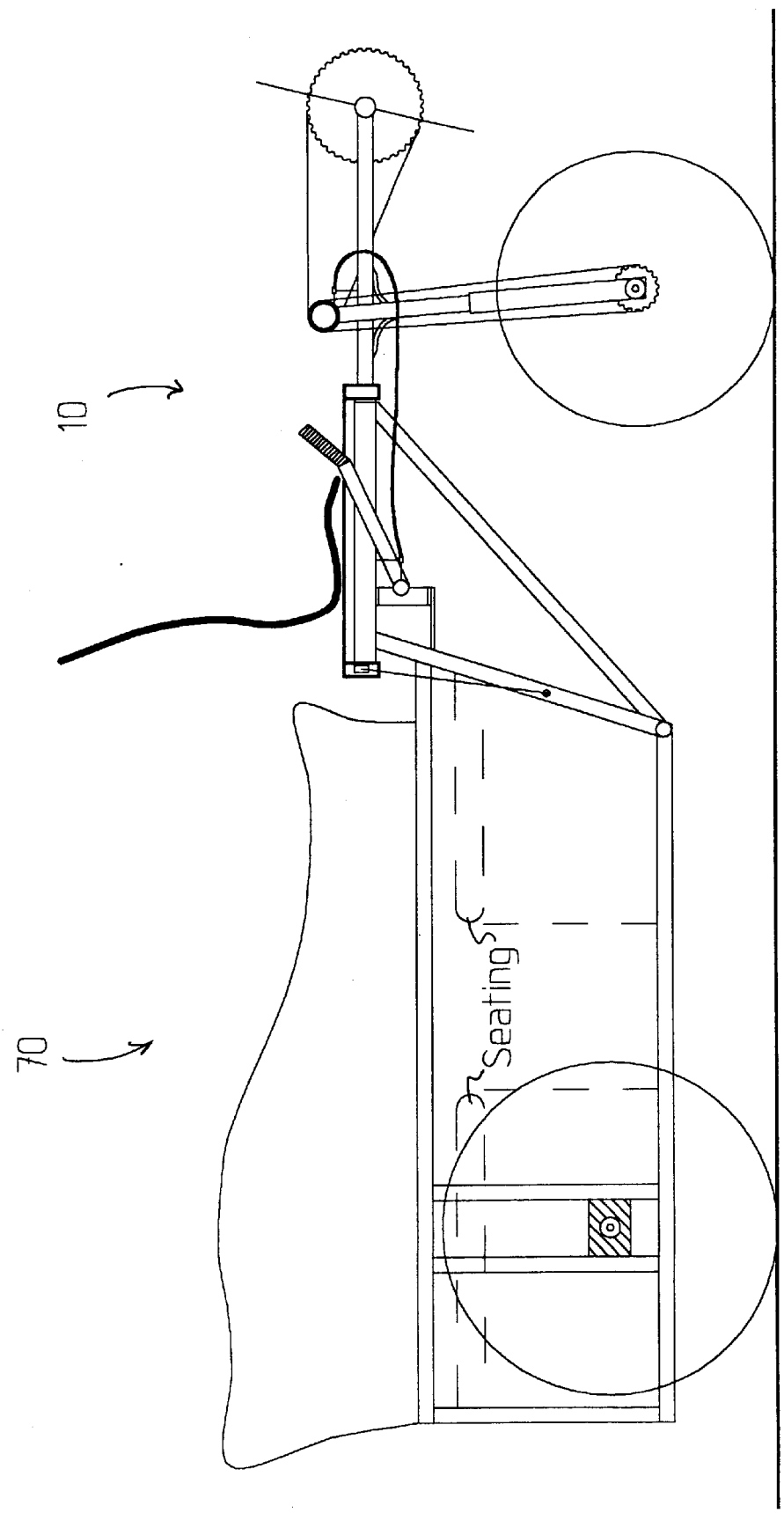
FIG. 10 is a side view demonstrating an alternate type of vehicle utilizing the same front sub-frame.
Figure 10A:
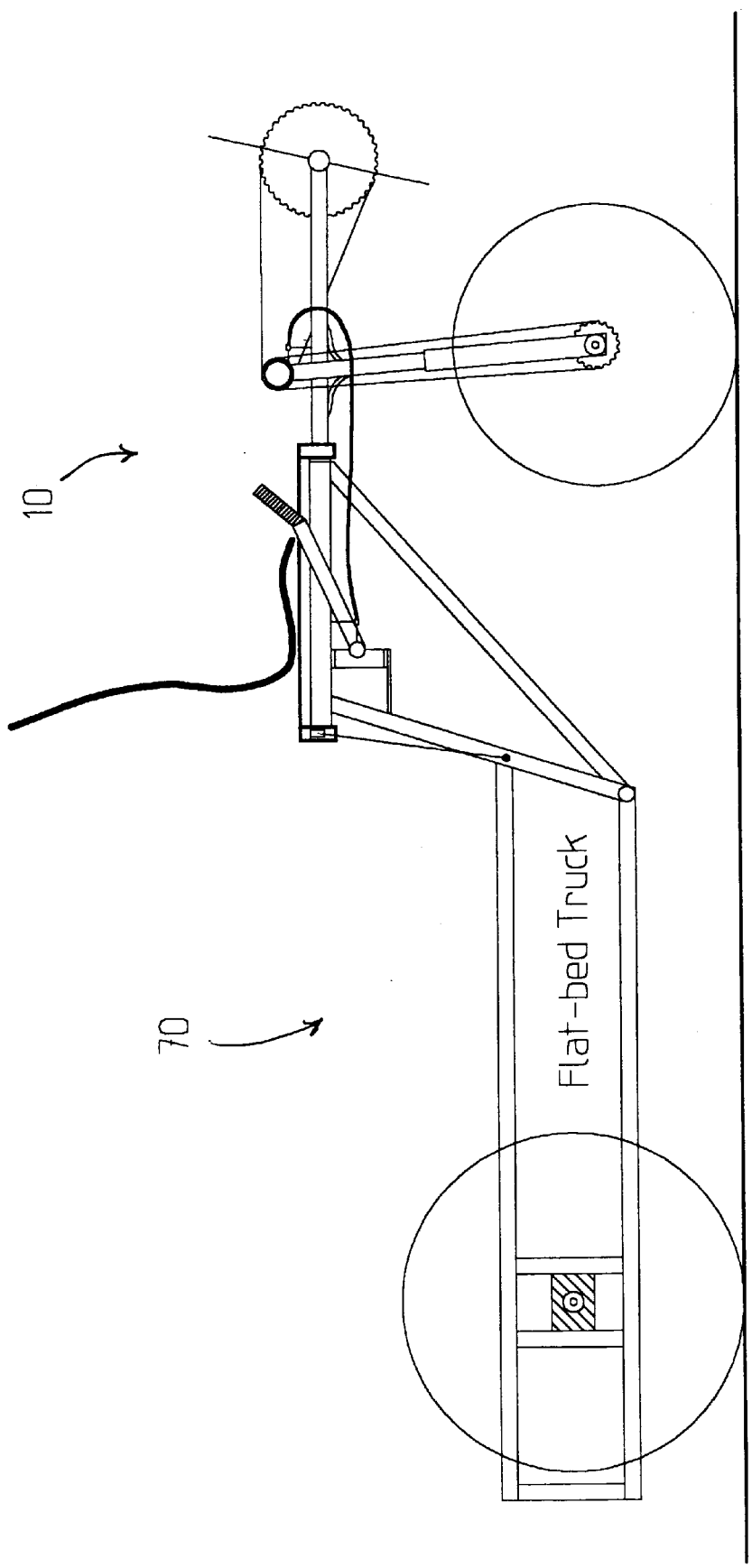
FIG. 10a is a side view of another alternate type of vehicle utilizing the same front sub-frame.

FIG. 10 is a side view demonstrating an alternate type of vehicle utilizing the same front sub-frame (10). The modular nature of the invention is illustrated here whereby the rear sub-frame (70) is designed for carrying passengers. FIG. 10a shows another possibility—a flat bed truck. Note that the only parts that need to be common to all rear sub-frames (70) are the rear top tube (71), handlebar (90), rear cable stops (95L, 95R), and the mounts for lean restraint cables (78L, 78R).

FIG. 11 shows a top view of the steering system where the steering cables (60) begin at the cable hold (64), run along the groove for steer cables (63) and leave the steer tube collar clamp (62) to enter their housings (61) at the front cable stops (65). The cables (60) then loop downward and back to the rear cable stops (95), where they exit their housings and attach to the handlebar (90) via standard cable-clamping bolts (commonly found on sidepull brakes). Small tabs (96L, 96R) on the handlebars support the clamping bolts. This routing provides a desirable amount of slack in order to maintain immunity from leaning distortions. Note that the cables need to cross once to impart normal steering. This results in the left cable (60L) and its housing (61L) crossing the midline of the bicycle to enter the right rear cable stop (95R). The left steering cable (60L) then continues to connect to the handlebar (90) at its right tab (96R).

8—OPERATION OF INVENTION

While the tricycle of the invention is driven in a similar manner to other human-powered vehicles where the driver rotates a pedal crank with his/her feet and steers a handlebar with hands, there are several distinct differences in the results of these actions based on the unique parts discussed heretofore.

Adjustability of various parts on the tricycle of the invention is important to accommodate many different sizes of drivers. Handlebar (90) adjustment can occur along any of its joints (94La, 94Lb, 94Ra, 94Rb). Note that each joint (94) can be adjusted by length and/or rotation. Seat (20) adjustment can occur along the full length of the supporting seat bar (21). In the case of a discontinuous front top tube (13, 13a), there is also adjustability for the overall length of the vehicle.

As the pedal crank (18) is driven, the top chain (40) transfers the rotational energy from the pedal crank (18) to the left u-joint sprocket (32L). The rotational energy is then transferred through the u-joint (31) to the right u-joint sprocket (32R). As the right u-joint sprocket (32R) rotates, the down chain (50) transfers the rotational energy to the front wheel hub (17). The front wheel hub (17) drives the front wheel (16) for vehicular locomotion.

Note that the rotational energy is still efficiently transferred throughout the full turning radius as per the intended function of the universal joint (31). This requires that the axis of deflection for the u-joint (103) is precisely aligned with the axis of rotation for the steer tube (102) (see FIG. 5).

Steering is accomplished by the driver rotating the handlebar (90) about the handlebar pivot joint (91). Such handlebar (90) rotation exerts a pulling effect upon one or the other of the steering cables (60L, 60R). This in turn pulls upon the steer tube (14) to induce a rotation. Since the front steered wheel (16) is affixed to the steer tube (14) via the front fork (15), the front wheel (16) is turned in response to pulls upon the steering cables (60L, 60R).

The recumbent driver position maintains the legs, which represent a significant amount of the driver's weight (approx. ⅓) and thus vehicular mass, as high as the seat and thus can create a 'top-heavy' effect. Previous recumbent human-powered vehicles, mostly bicycles and some tricycles, have very low seats in order to provide stability. As the tricycle of the invention has a relatively high seat height, i.e. a high center of gravity, the articulation (100) in the frame restores stability by providing for leaning.

Leaning is controlled by the driver exerting vertical forces upon the handlebar (90). For example, if the driver pulls up on the right hand grip (93R) while simultaneously pushing down on the left hand grip (93L), this will cause the front sub-frame (10) to lean to the right. Except for the hands, note that all other body contact, i.e. seat (20) and pedal crank (18), is with the front sub-frame (10) of the vehicle. Thus, the driver can use his/her hands to fully control the spatial relationship between the front and rear sub-frames (10, 70), i.e. the amount of lean. Since the frame articulation (100) rotates about a longitudinal axis of rotation (101) that is perpendicular to the vertical axis of the handlebar pivot joint (91), the driver can control the two functions of steering and leaning fully independently and with the same handlebar (90).

When riding a bicycle—where steering and leaning are independent—most people can consistently achieve the precise mix for a well balanced turn. The relation and proportion of the two functions are independently controllable by the driver's brain. The tricycle of the invention is equally amenable to such precise control due to its steering and leaning being independently controlled. The consistency with which the human brain performs the calculations of proportions of the amount of lean to the amount of steer is amazing. Such accuracy and consistency indicates that many factors are accurately inputed and assimilated into the well-controlled hand movements. Such factors include vehicle speed, weight, road surface, wind vectors, etc. Additionally, there is constant feedback and compensation during the turn to correct any miscalculations or unanticipated factors, such as wind gusts.

The two lean restraint cables (25L, 25R) incorporate a spring effect, by way of springs or elastomers, for providing some resistance to leaning, i.e. rotations about the articulation (100). This yields added control and a safe maximum of the leaning amount. Additionally, this aids the return of the front sub-frame (10) to the central, vertical position. This is also helpful when the vehicle is at rest, whereby the front sub-frame (10) is centered and stable. Thus, no kickstand nor other stabilizer is required.

Handlebar (90) attachment to the rear sub-frame (70) provides a sensory input to the driver of the orientation of the rear sub-frame (70). This is particularly important due to common variations in road surfaces. Such variations may be transient, such as a pothole, or longer lasting, such as a road grade. In either case, as the orientation of the rear sub-frame (70) changes, the driver can sense this by the movements of the handlebar (90). This is possible due to the fact that the handlebar (90) is fixed to the rear sub-frame (70) via a vertical handlebar pivot joint (91) such that the handlebar (90) always stays parallel to the rear wheels (80L, 80R). In this way, the driver can literally feel up and down rear wheel (80L, 80R) movements through the handlebars (90). This sensation is very beneficial as the driver can cancel the strong pulling effect of road grade by maintaining a near-vertical orientation of the front sub-frame (10) with his/her hands. Even in the quick reaction of a pothole, where one rear wheel (80L or 80R) drops and returns quickly, the driver can feel this and exert compensatory forces into the hand grips (93L, 93R) in order to maintain balance and verticality of the front sub-frame (10). Here also, the human brain's potential is exercised in precise control of the vehicular orientation. In essence, the human body becomes an active suspension system, such as found in the world's best cars.

Two support cables (77L, 77R) run from the front end of the rear top tube (71) to the front corners of the cargo rack (75). These cables (77L, 77R) run downward, rearward and laterally. Cables (77L, 77R) are used instead of tubes because the structural requirements here are tensile, without any need for compression resistance. This is based upon the fact that the bulk of the vehicular mass (the driver), is located between the front wheel (16) and rear wheels (80L, 80R) such that gravity creates a 'spreading' force whereby the front wheel (16) tends to increase its distance from the rear wheels (80L, 80R). This in turn tends to increase the distance between the front end of the front top tube (13) and the front corners of the cargo rack (75). Hence, the support cables (77L, 77R) resist these tendencies. Additionally, the cables (77L, 77R) provide stability to the rear section upon asymmetrical forces, as may be experienced by one rear wheel (80L or 80R) falling into a pothole. Such a force induces a considerable torque upon the down tube (72). Such torque is countered by the cables (77L, 77R) based on their orientation within the rear sub-frame (70).

Note that the placement of the cargo rack (75) is very low, and centered over the midline of the vehicle. This provides for very stable cargo carrying as the addition of a load underneath the driver actually lowers the center of gravity for the vehicle. Indeed, load carrying improves the stability of the overall vehicle.

9—CONCLUSION, RAMIFICATIONS, AND SCOPE OF INVENTION

Thus, the reader will see that the tricycle of the invention provides for efficient personal transportation with cargo carrying capacity. It has no fuel requirements and is a zero emission vehicle. The invention operates quietly and requires very little maintenance. It provides a highly ergonomic recumbent driver position for efficient exercise during locomotion. The invention's high seat placement provides for excellent visibility for the driver and of the driver. The narrow wheelspan allows for access to minimal traffic openings on highly congested city streets. The articulated frame—with its high longitudinal axis of rotation—provides for leaning into turns. This restores stability that was compromised by high seat height and narrow wheelspan. Handlebar mounting to the rear sub-frame, with all other body contact to the front sub-frame, grants the driver with direct control over the relationship between the front and rear sub-frames whereby leaning is precisely controlled. Dual cable steering provides accurate control that is immune to distortions caused by articulation rotations during leaning. The modular nature of the invention, whereby the front sub-frame can be mated to many different types of rear sub-frames, greatly expands the scope of the invention as the overall purpose of any individual vehicle can be customized.

While the above description contains many specificities, these should not be construed as limitations on the scope of the invention, but rather as an exemplification of one preferred embodiment thereof. For example, tubular frame structures illustrated could be replaced by shell-like bodies with inherent structural integrity. Many different types of materials could be used in the construction of the invention, such as plastic, metal, fibrous resins such as fiberglass, carbon fiber, etc. The tricycle of the invention could also be made in many different sizes, where the component parts that are contacted by the driver are within functional ranges of the human form.

Accordingly, the scope of the invention should be determined not by the embodiments illustrated, but by the appended claims and their legal equivalents.

I claim:

1. A three-wheeled vehicle comprising:
   a) a front sub-frame and a rear sub-frame connected by an articulation means,
   b) said front sub-frame including a single wheel that is steerable relative to said front sub-frame,
   c) said front sub-frame further including means for powering said single wheel, and a seat,
   d) said rear sub-frame including two rear wheels, and a handlebar,
   e) said articulation means including a substantially horizontal longitudinal axis of rotation,
   f) said longitudinal axis of rotation being located at a height less than the seat bottom,
   whereby movement of said articulation means permits said front sub-frame to rotate about said longitudinal axis relative to said rear sub-frame.

2. The vehicle of claim 1 wherein the means for powering said front wheel is adapted to utilize human power via a pedal crank.

3. The vehicle of claim 2 wherein the means for powering said front wheel includes:
   a) a universal joint hub intermediate between said pedal crank and said front drive wheel
   whereby locomotive power is transferred from the pedal crank to the universal joint hub, and subsequently power is transferred from the universal joint hub to said front drive wheel.

4. The vehicle of claim 3 wherein said locomotive power is transferred from the pedal crank to the universal joint hub via a first endless looped material, and said locomotive power is subsequently transferred from the universal joint hub to the front drive wheel via a second endless looped material.

5. The vehicle of claim 4 wherein the universal joint hub is located directly over a steer tube, whereby the axis of deflection of the universal joint is aligned with the axis of rotation for the steer tube.

6. The vehicle of claim 1 wherein lateral displacement of the tire contact patch of the front drive wheel is greater than the lateral displacement of the bottom of the seat during rotations of the front sub-frame about said longitudinal axis of rotation.

7. The vehicle of claim 1 wherein said articulation means comprises a telescope-type articulation including:
   a) two tubes whose central longitudinal axis coincides with said longitudinal axis of rotation, and
   b) the diameter of the first of said tubes is slightly larger than the diameter of the second of said tubes, and
   c) said tubes overlap such that the inner surface of the first tube slides against the outer surface of the second tube.

8. The vehicle of claim 7 wherein said articulation is adjustable in its degree of overlap.

9. The vehicle of claim 7 wherein said articulation can be disarticulated, whereby said front sub-frame can be re-articulated with a different rear sub-frame.

10. The vehicle of claim 1 wherein a steering means comprises two cables linking the handlebar to the steer tube.

11. A multi-wheeled vehicle comprising:
   a) a steerable front wheel having a first axis of rotation,
   b) means for powering said steerable front wheel,
   c) a means for flexible coupling rotational power intermediate said means for powering said front wheel and said front wheel,
   d) said means for flexibly coupling rotational power comprising a element having a second axis of rotation and a second element having a third axis of rotation, said second axis and said third axis are substantially perpendicular to a steering axis of said front wheel,
   e) said second axis and said third axis are substantially co-planar,
   f) said second axis and said third axis are substantially collinear during straight locomotion of said vehicle, and said second axis and said third axis become non-collinear during steering of said steerable front wheel,
   g) substantially co-planar with a central plane of said steerable front wheel, whereby locomotive power is transferred from said means for powering said front wheel to the means for flexibly coupling rotational power, and subsequently power is transferred from the means for flexibly coupling rotational power to said front wheel whereby during steering of said front wheel, said first axis and said second axis and said second axis remaining substantially parallel and said third axis remains substantially fixed relative to said vehicle, whereby said locomotive power is transferred to said wheel without affecting steering of said wheel.

12. The vehicle of claim 11 wherein the number of wheels is three.

13. The vehicle of claim 11 wherein the number of wheels is two.

14. The vehicle of claim 11 wherein all the means for powering said front wheel is adapted to utilize human power.

15. The vehicle of claim 11 wherein one or more axes of deflection of the flexible coupling means are aligned with the steering axis of said front wheel.

16. The vehicle of claim 11 wherein said means for flexible coupling rotational power comprising a universal joint.

* * * * *